UNITED STATES PATENT OFFICE.

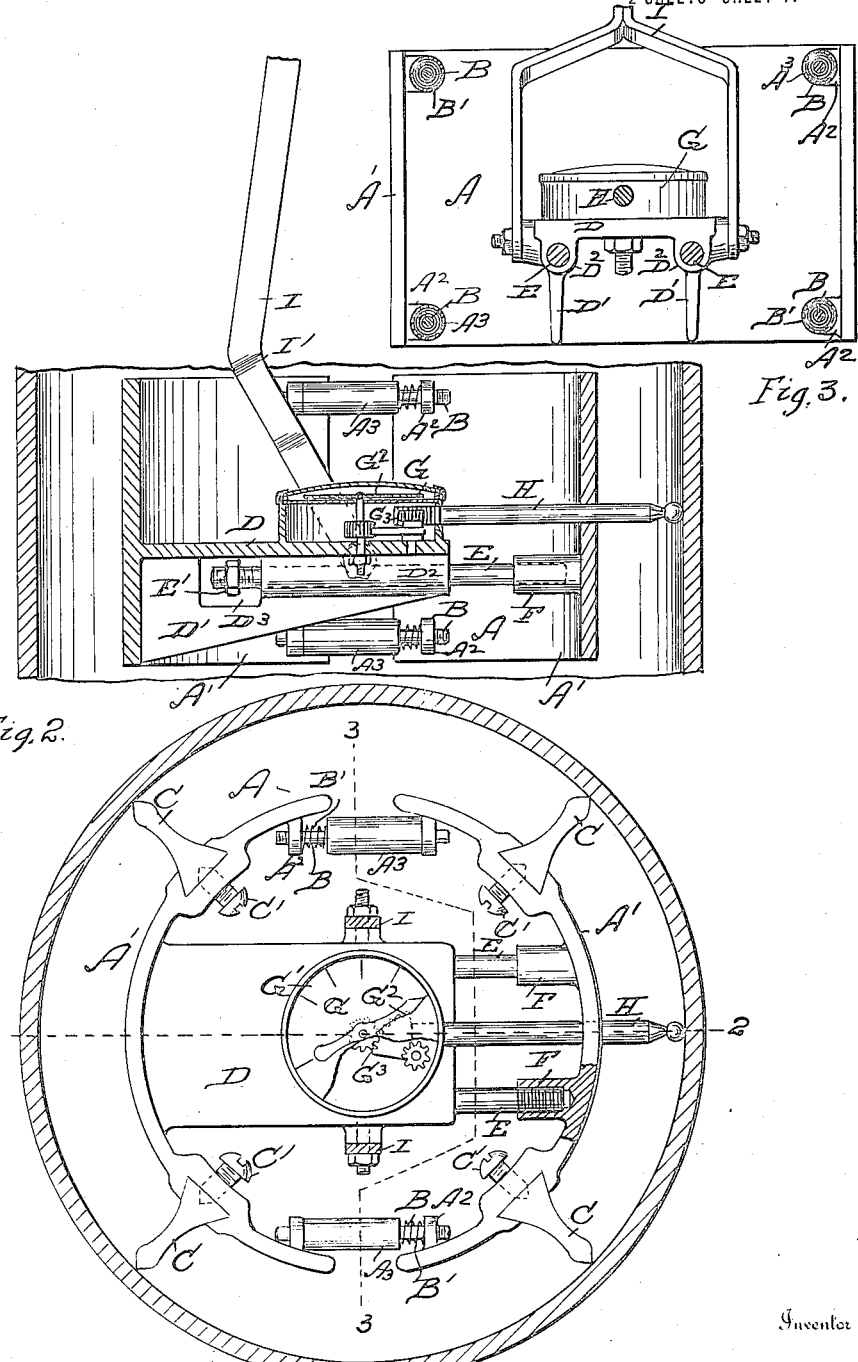

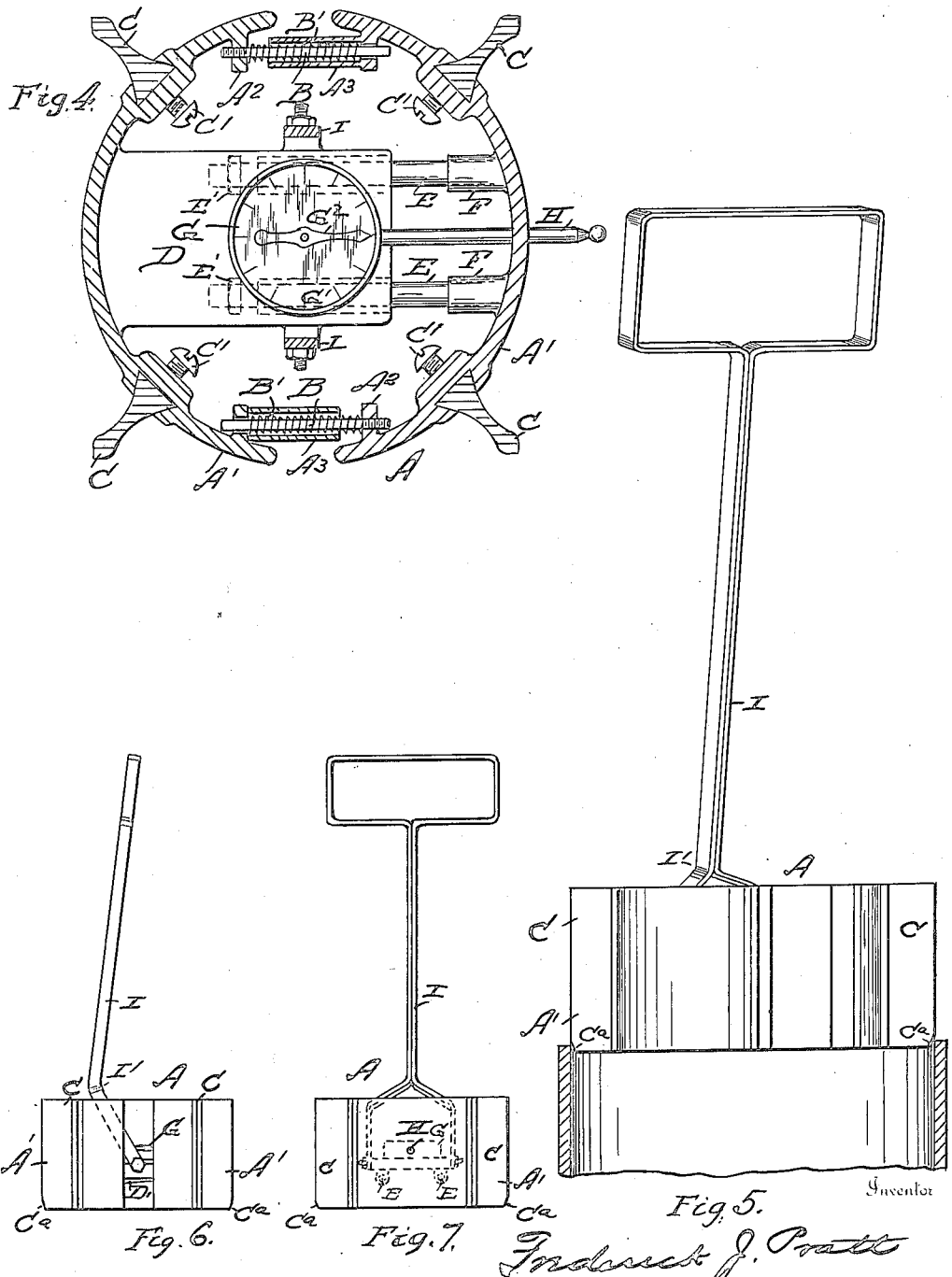

FREDERICK J. PRATT, OF DETROIT, MICHIGAN.

GAUGE FOR CYLINDERS.

1,425,284.  Specification of Letters Patent.  Patented Aug. 8, 1922.

Application filed March 5, 1921. Serial No. 449,710.

*To all whom it may concern:*

Be it known that I, FREDERICK J. PRATT, citizen of the United States, residing at Detroit, county of Wayne, State of Michigan, have invented a certain new and useful Improvement in Gauges for Cylinders, and declare the following to be a full, clear, and exact description of the same, such as will enable others skilled in the art to which it pertains to make and use the same, reference being had to the accompanying drawings, which form a part of this application.

This invention relates to a device for testing cylinder bores, and it embodies means whereby any variation or irregularity of the cylinder bore may be quickly and readily noted;—it being essential to test same from time to time to insure uniformity of the product.

It is one of the objects of my invention to provide a device which is adapted to measure directly upon the diameter of the bore and from end to end of the cylinder, and also to provide an unobstructed view of the movable indicator that any variation may be easily and readily determined.

A further object of the invention is to provide a device having a plurality of interchangeable radial contact shoes or points, spaced equi-distantly and designed to bear upon the wall of the cylinder bore to position the device within the cylinder so that its longitudinal axis will be in alignment with the longitudinal axis of the cylinder bore;—a radially movable stylus being employed in conjunction therewith adapted to traverse the cylinder wall and to actuate an indicating gauge that any variation in the bore may be determined upon manually moving the device through the cylinder.

A further object of the invention is to provide for the interchange of suitable contact shoes or points of varying length, to adapt the device to cylinders of any bore whereby any variations from the established standard will be indicated upon the gauge due to the action of the radially movable stylus.

A further object of the invention is to provide means for securing the contact shoes or points in their predetermined position.

A further object is to provide a control handle adapted for manually supporting the device whereby the operator may cause it to enter and traverse the cylinder bore and without employing both hands to perform this operation.

Another feature of the invention consists in a pair of pilot bars connecting the spaced members of the shell and also a pair of rods upon which springs are sleeved to maintain the members of the shell in expanded relation, the extent of the latter however being determined by means provided to limit the expansion of the divided shell.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a plan view of the device, with parts broken away and in section, inserted in an engine cylinder.

Figure 2 is a vertical cross-sectional view through the device on line 2—2 of Figure 1.

Figure 3 is a vertical cross-sectional view taken on or about line 3—3 of Figure 1, with a portion of the operating handle broken away.

Figure 4 is a horizontal cross-sectional view through the device removed from the bore of the cylinder.

Figure 5 is a side elevation of the device horizontally suspended by the supporting handle, in position to enter the bore of a cylinder,—the view indicating the contact shoes or points chamfered at their lower edge to facilitate the entry of the divided shell into the cylinder.

Figure 6 is a side elevation of the device turned at a different angle to that shown in Figure 5, to indicate more clearly the crook in the supporting handle, whereby the grip of the latter may be directly above its lower pivotal connection that the device may be maintained in a horizontal position to facilitate its ready entry into the cylinder.

Figure 7 is a side elevation of the device taken at right angles to that indicated in Figure 6.

Referring now to the letters of reference placed upon the drawings:—

A, is a shell comprising two arc-shaped portions A', A' adjustably connected together by rods B, B, which are respectively screwed at one end into a projecting lug A², extending inwardly from each portion of the shell;—the opposite end of each of the rods being adapted to project loosely through sleeves A³, respectively integral with each of the opposing portions of the shell. B' are springs sleeved upon the rods B, to force apart the divided portions of the shell. C, denotes a plurality of removable contact shoes or points secured by set screws C' in dove-tailed ways formed in each portion of the shell. The outer edges of the shoes C are designed to bear upon the wall of a cylinder bore and are made interchangeable to adapt the device to predetermined bores of other cylinders that the edges of the shoes contacting with the cylinder wall may be equally spaced from each other when in position. Extending inwardly from one portion of the divided shell is a platform D supported by brackets D' integral at one end with the wall of the shell. The forward end of the brackets D' are enlarged as indicated at D² and provided with a bore to receive the pilot rods E, which are screwed or shrunk into lugs F, extending inwardly from each of the opposing arc-shaped portion of the shell. The rods E project loosely through the enlarged bore in the brackets and at the rear of the latter are fitted with nuts E' to limit the separation of the divided portions of the shell. The brackets D' are also formed with an opening D³, to facilitate the adjustment of the nut E'. G is an indicating gauge of usual construction, G' is its graduated dial and G² denotes a swinging pointer actuated by a suitable train of gears mounted in the dial case.

H, is a movable stylus having a rack-bar at one end to actuate the train of gears G³, its opposite end extending through an aperture in the shell that it may bear upon and traverse the surface of a cylinder bore.

I, denotes an operating handle having a yoke-shaped lower end pivoted to the device. The handle is given an angular form as I', so that its yoke-shaped portion may not obstruct the operator's view of the graduated dial that he may readily detect any movement of the swinging pointer upon manually shifting the device throughout the length of the cylinder bore.

It will be noted that the handle above its yoke portion is inclined to a point intersected by the vertical axis of the divided shell, where it is fitted with a spade-grip,— the object being to insure a horizontal suspension of the divided shell that it may more readily enter the end of the cylinder and to avoid the necessity of the operator employing both hands to insert the device in the end of the cylinder. To further assist the ready insertion of the device in the cylinder bore the lower edge Cᵃ, of the contact shoes are chamfered.

Having now indicated the several parts by reference letters the construction and operation of the device will be readily understood.

Before entering the device in the cylinder it is fitted with proper contact shoes C to adapt it for the predetermined bore of the cylinder, and while any plural number of radially disposed contact shoes may be employed I prefer to use four, as indicated in the drawings. The device supported horizontally by the handle is inserted thereby in the bore of the cylinder, which also facilitates shifting its position throughout the length of the cylinder that any variation in its bore may be indicated by the swinging pointer due to the operation of the movable stylus,—the peculiar shape of the handle making it possible for the operator to see the face of the dial to note the movements of the pointer at all times.

Having thus described my invention what I claim is:—

1. In a device of the character described, a divided cylindrical shell, yieldable means connecting the portions of the shell together, radially disposed removable shoes supported in the wall of each portion of said shell, their outer edges being adapted to contact with the wall of a cylinder bore, whereby the central axis of the device may register with the central axis of the cylinder bore, an indicating gauge supported centrally within said shell, and a yieldable stylus adapted for traversing the bore of the cylinder to be tested and to actuate said indicating gauge by its horizontal movement, whereby variations in the bore of the cylinder may be determined.

2. In a device for testing cylinder bores, a shell, a plurality of shoes extending radially from the vertical axis of the shell adapted to contact with the peripheral surface of the cylinder bore to be tested, a gauge including a radially yieldable stylus to traverse the surface of the cylinder bore, whereby variations in the surface of the latter may be indicated by the gauge, and a handle pivoted to the shell on a line with a lateral substantially central axis of the shell, whereby the shell may assume a horizontal position when suspended by the handle, the handle being bent midway of its length to provide an unobstructed view of the gauge while manually operating the device throughout the length of the cylinder.

3. In a device for testing cylinder bores, a shell, a plurality of shoes extending radially from vertical axis of the shell adapted to contact with the peripheral surface of the cylinder bore to be tested, a gauge including a radially yieldable stylus to traverse the surface of the cylinder bore, whereby variations in the surface of the latter may be indicated by the gauge, and a handle having a yoke-shaped portion adapted to straddle the gauge, the ends of the yoke being pivoted to the shell on a line with a lateral substantially central axis of the shell, the handle being inclined laterally from its pivotal connection with the shell and toward the central longitudinal axis of said shell, and fitted with a handle grip at its free end whereby the shell will assume a substantially horizontal plane when suspended by the handle above the bore of a cylinder, that it may readily enter the latter.

4. In a device for testing cylinder bores, a divided shell having an opening therein, a plurality of radially supported shoes carried by said shell having projecting edges adapted to bear upon the wall of the cylinder to be tested, a plurality of rods connecting the members of the divided shell, springs sleeved on the rods to maintain the members of the divided shell in expanded relation, a testing gauge mounted centrally within the shell provided with a yieldable stylus extending radially through said opening in the shell, whereby it may traverse a cylinder bore and actuate the gauge, a pair of pilot-rods secured at one end to one portion of the divided shell and extending loosely through openings in the wall of the opposing portion of the shell, and nuts engaging the ends of said pilot rods to limit the expansion of the divided sleeve members.

5. In a device for testing cylinder bores, a yieldable shell comprising semi-circular sections, a platform carried by one of the sections, having brackets depending therefrom, pilot rods supported from the opposite section and extending through said brackets, adjusting nuts threaded on said rods, braces for the platform having openings therein to receive the said adjusting nuts and a gauge mounted on the platform provided with a yielding stylus contacted with the walls of the cylinder bore whereby irregularities in the cylinder are indicated by said gauge.

6. In a device of the class described, a yieldable shell composed of semi-circular sections, a platform having side lugs and depending brackets thereon cast integrally with one of the said sections, pilot rods carried by the opposite section and extending through the brackets, adjusting nuts forming stops threaded on one end of the pilot rods, a handle having a bifurcated end straddling the said platform and secured to the side lugs at substantially the central vertical axis of the shell.

In testimony whereof, I sign this specification in the presence of two witnesses.

FREDERICK J. PRATT.

Witnesses:
S. E. THOMAS,
R. C. MACLACHLAN.